3,091,606
ORGANOLITHIUM POLYMERIZATION INITIATOR PREPARED IN THE PRESENCE OF A SMALL AMOUNT OF SODIUM
Henry L. Hsieh, Bartlesville, Okla., assignor to Phillips Petroleum Company, a corporation of Delaware
No Drawing. Filed Nov. 21, 1960, Ser. No. 70,421
17 Claims. (Cl. 260—94.2)

This invention relates to the preparation of polymerization initiators. In accordance with one aspect, this invention relates to an improved process for preparing an initiator comprising a lithium adduct of conjugated dienes and/or vinylidene-substituted aromatic compounds. In accordance with another aspect, this invention relates to the initiator compositions thus prepared and to the use of these initiators in the polymerization of conjugated dienes.

Initiator compositions comprising lithium adducts of conjugated dienes and/or vinylidene-substituted aromatic compound monomers have been prepared and used as polymerization initiators. These adducts can be prepared in an ether medium in the presence or absence of promoters. While some monomers are sufficiently reactive that adduct formation occurs in a relatively short time, the reaction of lithium with other monomers proceeds at a very slow rate. In some cases where a reaction occurs, the monomeric compound undergoes polymerization rather than the desired adduct formation in which, at most, only a small number of diene units are present per two lithium atoms.

The present invention relates to an improved process for preparing such adducts wherein the reaction rate between lithium and the monomer is materially increased and adducts of higher molarity, based on the lithium, are obtainable than are otherwise obtained by keeping polymerization of the monomer at a minimum.

Accordingly, an object of this invention is to provide an improved process for preparing a lithium adduct of a conjugated diene and/or a vinylidene-substituted aromatic compound.

Another object of this invention is to provide lithium adducts of conjugated dienes and/or vinylidene-substituted aromatic compounds in relatively high molar concentration in an ether solvent.

Still another object of this invention is to provide an improved process for increasing the reaction rate in the preparation of organolithium initiators.

Still another object is to provide a process for preparing conjugated diene polymers.

Further objects, advantages and features of my invention will be apparent from the following discussion.

I have now found that polymerization initiator compositions capable of polymerizing conjugated dienes to polymers of relatively low vinyl content can be prepared by contacting lithium in a medium of aliphatic monoether with a conjugated diene or with a vinylidene-substituted aromatic compound in the presence of a small amount of sodium. I have further found that not only is the reaction rate increased in the formation of the adduct, but it is possible to obtain adducts of higher molarity, based on the lithium, than are otherwise obtained, this latter effect being realized by keeping polymerization of the diene and/or aromatic compound at a minimum.

The amount of sodium employed in the preparation of the lithium adduct of the invention generally ranges from about 0.25 to about 5 weight percent based on the lithium, preferably from about 0.5 to about 3 weight percent, although amounts outside these ranges can be employed when desired. However, too small an amount of sodium ordinarily will not give the desired advantage in rate of adduct formation while too large an amount will have an effect on the configuration of polymers prepared using these initiators. When operating within the limits specified above, the desired improvement in rate of adduct formation is accomplished and the polymers prepared with these initiators have essentially the same configuration as those prepared with initiators free of sodium or containing, at most, only a trace.

Conjugated dienes employed in the production of the initiators of this invention are 1,3-conjugated dienes containing from 4 to 12, inclusive, carbon atoms per molecule. Examples of these compounds include the following: 1,3-butadiene, isoprene, 2,3-dimethyl-1,3-butadiene, 1,3-pentadiene (piperylene), 2-methyl-3-ethyl-1,3-butadiene, 3-methyl-1,3-pentadiene, 2-methyl-3-ethyl-1,3-pentadiene, 2-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, phenyl-1,3-butadiene, 2,3-diethyl-1,3-butadiene, 2,3-di-n-propyl-1,3-butadiene, 2-methyl-3-isopropyl-1,3-butadiene, and the like. Among the dialkylbutadienes, it is preferred that the alkyl groups contain from 1 to 3 carbon atoms.

In addition to or in place of the above-described conjugated diolefins, vinylidene-substituted aromatic compounds can be combined with lithium to form polymerization initiators. These compounds include styrene, alpha-methylstyrene, 1-vinylnaphthalene, 2-vinylnaphthalene, 1-alpha-methylvinylnaphthalene, 2-alpha-methylvinylnaphthalene, anl alkyl, cycloalkyl, aryl, alkaryl, and aralkyl derivatives thereof in which the total number of carbon atoms in the combined hydrocarbon substituents is generally not greater than 12. Examples of these compounds include:

3-methylstyrene (3-vinyltoluene)
3,5-diethylstyrene
4-n-propylstyrene
2,4,6-trimethylstyrene
4-dodecylstyrene
3-methyl-5-n-hexylstyrene
4-cyclohexylstyrene
4-phenylstyrene
2-ethyl-4-benzylstyrene
4-p-tolylstyrene
3,5-diphenyl-alpha-methylstyrene
2,4,6-tri-tert-butyl-alpha-methylstyrene
2,3,4,5-tetramethyl-alpha-methylstyrene
4-(4-phenyl-n-butyl)-alpha-methylstyrene
3-(4-n-hexylphenyl)-alpha-methylstyrene
4,5-dimethyl-1-vinylnaphthalene
2,4-diisopropyl-1-vinylnaphthalene
3,6-di-p-tolyl-1-vinylnaphthalene
6-cyclohexyl-1-vinylnaphthalene
4,5-diethyl-8-octyl-1-vinylnaphthalene
3,4,5,6-tetramethyl-1-vinylnaphthalene
3,6-di-n-hexyl-1-vinylnaphthalene
8-phenyl-1-vinylnaphthalene
5-(2,4,6-trimethylphenyl)-1-vinylnaphthalene
3,6-diethyl-2-vinylnaphthalene
7-dodecyl-2-vinylnaphthalene
4-n-propyl-5-n-butyl-2-vinylnaphthalene
5,8-dicyclopentyl-2-vinylnaphthalene
3-hexyl-7-phenyl-2-vinylnaphthalene
2,4,6,8-tetramethyl-1-alpha-methylvinylnaphthalene
3,6-diethyl-1-alpha-methylvinylnaphthalene
6-benzyl-1-alpha-methylvinylnaphthalene
3-methyl-5,6-diethyl-8-n-propyl-2-alpha-methylvinylnaphthalene
4-o-tolyl-2-alpha-methylvinylnaphthalene
5-(3-phenyl-n-propyl)-2-alpha-methylvinylnaphthalene,
and the like In describing my invention, the conjugated dienes and the vinylidene-substituted aromatic compounds are referred to as "monomers."

The lithium can be used in any form desired, such as wire, chunks, or shot, or in a finely divided state. It is preferred that at least one gram atom of lithium be used per mole of monomer and generally two or more gram atoms per mole of monomer is employed. The presence of excess (for example, 5 to 50 weight percent excess) lithium also serves to minimize polymerization of the monomer.

It is also within the scope of the present invention to employ promoters such as the condensed ring aromatic compounds or monoalkyl-substituted derivatives thereof in which the alkyl groups contain from 1 to 3 carbon atoms, and the polyaryl-substituted ethylenes such as disclosed and claimed in copending application of C. W. Strobel, Serial No. 64,278, filed October 24, 1960.

The polycyclic aromatic compounds and polyaryl-substituted ethylenes are referred to as "promoters," although their role in the formation of the initiator composition is not fully understood. Examples of suitable promoter compounds include the following: naphthalene, anthracene, phenanthrene, 1-methylnaphthalene, 2-methylnaphthalene, 1-ethylnaphthalene, 2-n-propylnaphthalene; monomethyl, monoethyl, and monopropyl derivatives of anthracene and phenanthrene; and 1,2-diphenylethylene, 1,2-diphenylethylene (stilbene), triphenylethylene, tetraphenylethylene, 1 - phenyl - 1 - naphthylethylene, 1,2-diphenyl-2-naphthylethylene, 1,1-diphenyl - 2(1-naphthyl)-ethylene, tri-2-naphthylethylene, and the like. The quantity of polycyclic aromatic compound or polyaryl-substituted ethylene employed can vary over a broad range. The amount will generally not exceed 2 moles per mole of conjugated diene and/or vinylidene-substituted aromatic compound monomer, and it is frequently 1 mole or less per mole of monomer.

When preparing the initiators of the invention, the monomer, solvent, lithium, promoter (if used) and sodium are contacted under mild agitating conditions, or vigorous agitation if desired, in an inert atmosphere such as argon or nitrogen. Suitable solvents are the aliphatic monoethers. The methoxyethers are to be avoided since they are too active. The aliphatic monoethers which can be used individually or as mixtures are represented by the formula ROR in which R is alkyl group containing from 2 to 12 carbon atoms. Compounds which are representative of the suitable ethers include diethyl ether, di-n-propyl ether, diisopropyl ether, ethyl isopropyl ether, ethyl-n-butyl ether, di-n-butyl ether, isopropyl tert-butyl ether, n-propyl-n-butyl ether, di-n-amyl ether, diisoamyl ether, di-n-hexyl ether, di-(2-ethylhexyl) ether, dioctyl ether, isopropyl octyl ether, dodecyl ether, didodecyl ether, ethyl dodecyl ether, di-tert-butyl ether, di-(2,4,6-trimethyloctyl) ether, di-(2,4-diisopropylhexyl) ether, and the like.

The relative amounts of monomer, promoter (when used) and solvent employed in preparing the initiator compositions are conveniently expressed as a molar ratio based upon the monomer used. The amount of ether employed is rarely less than an equal molar ratio to the monomer and as much as 20 moles of ether per mole of monomer can be used. It has been found that from about 2 to 8 moles of ether per mole of monomer gives very satisfactory results and in general it is desirable to keep the concentration of ether low.

The reaction temperature can range from about −40 to about 170° F., but is preferably in the range from about −25 to about 125° F. Temperatures should be below 41° F. for active monomers such as butadiene and styrene, and below 100° F. for isoprene. For the less active monomers such as dimethylbutadiene, it is preferred to operate at temperatures of 41° F. and above. The time required for formation of the adduct depends on various factors such as temperature, rate of agitation, and concentration of the diene solution. In general, the time required is in the range from about 10 minutes to 100 hours, or longer.

Various factors such as temperature, rate of agitation, the particular monomer used, amount of sodium, temperature, etc., influence the type of initiator formed, i.e., the molarity of adduct. Stated in other terms, this means the number of monomer units per 2 lithium atoms. When operating conditions are adjusted as herein described, the adduct is made up of a mixture of products containing from 1 to 10 monomer units per 2 lithium atoms, and conditions are preferably regulated to give products containing predominantly 1 to 5 monomer units per 2 lithium atoms.

The initiator compositions hereinbefore described are frequently obtained in the form of slurries. When making a liquid polymer, it is preferred that the initiator be soluble in the polymerization medium. This method of operation is in the interest of obtaining a polymer having a narrow molecular weight range. These initiator compositions can be solubilized by the addition of any of the conjugated dienes or aromatic monomers used in their preparation. The solubilizing agent is added slowly or in increments in order to control the temperature. Solubilization is generally effected at a temperature in the range from 20 to 60° F., preferably below 50° F. Too high a temperature causes decomposition of the adduct. The quantity of solubilizing agent will depend upon the adduct being solubilized as well as upon the agent used, and will generally be in the range from 2 to 10 moles per mole of adduct, preferably 2 to 6 moles. Subsequent to solubilization, ether can be removed by any means such as by purging with nitrogen and the residue dissolved in a hydrocarbon solvent.

The monomers which can be polymerized in the presence of the lithium adducts of my invention are conjugated dienes containing from 4 to 12 carbon atoms, preferably 4 to 8 carbon atoms per molecule. Examples of these conjugated dienes are the same as those given in regard to the monomers used in the initiator preparation. In addition, the above conjugated dienes containing substituents along the chain can also be employed such as, for example, halogenated and alkoxy-substituted dienes such as chloroprene, fluoroprene, 2-methoxy-1,3-butadiene, 2-ethoxy-3-ethyl - 1,3 - butadiene, 2-ethoxy-3-methyl-1,3-hexadiene, and the like. Of the conjugated dienes, the preferred monomers are butadiene, with isoprene and piperylene also being especially suitable. The conjugated dienes can be polymerized alone or in admixture with each other to form copolymers or by charging the dienes sequentially to form block copolymers.

In addition to the above-named conjugated dienes, other monomers can be copolymerized with these dienes, including such monomers as vinyl-substituted aromatic compounds such as styrene, 1-vinylnaphthalene, 2-vinylnaphthalene, and alkyl, cycloalkyl, aryl, alkaryl, aralkyl, alkoxy, aryloxy, and dialkylamino derivatives thereof in which the total number of carbon atoms in the combined substituents is generally not greater than 12. Examples of such derivatives include 3-methylstyrene (3-vinyltoluene)
3,5-diethylstyrene
4-n-propylstyrene
2,4,6-trimethylstyrene
4-dodecylstyrene
3-methyl-5-n-hexylstyrene
4-cyclohexylstyrene
4-phenylstyrene
2-ethyl-4-benzylstyrene
4-p-tolylstyrene
3,5-diphenylstyrene
2,4,6-tri-tert-butylstyrene
2,3,4,5-tetramethylstyrene
4-(4-phenyl-n-butyl)styrene
3-(4-n-hexylphenyl)styrene 4-methoxystyrene
3,5-diphenoxystyrene
3-decoxystyrene
2,6-dimethyl-4-hexoxystyrene
4-dimethylaminostyrene
3,5-diethylaminostyrene
4-methoxy-6-di-n-propylaminostyrene
4,5-dimethyl-1-vinylnaphthalene
3-ethyl-1-vinylnaphthalene
6-isopropyl-1-vinylnaphthalene
2,4-diisopropyl-1-vinylnaphthalene
3,6-di-p-tolyl-1-vinylnaphthalene
6-cyclohexyl-1-vinylnaphthalene
4,5-diethyl-8-octyl-1-vinylnaphthalene
3,4,5,6-tetramethyl-1-vinylnaphthalene
3,6-di-n-hexyl-1-vinylnaphthalene
8-phenyl-1-vinylnaphthalene
5-(2,4,6-trimethylphenyl)-1-vinylnaphthalene
3,6-diethyl-2-vinylnaphthalene
7-dodecyl-2-vinylnaphthalene
4-n-propyl-5-n-butyl-2-vinylnaphthalene
6-benzyl-2-vinylnaphthalene
3-methyl-5,6-diethyl-8-n-propyl-2-vinylnaphthalene
4-o-tolyl-2-vinylnaphthalene
5-(3-phenyl-n-propyl)-2-vinylnaphthalene
4-methoxy-1-vinylnaphthalene
6-phenoxy-1-vinylnaphthalene
3,6-dimethylamino-1-vinylnaphthalene
7-dihexoxy-2-vinylnaphthalene, and the like The vinyl-substituted aromatic compounds can be copolymerized with the conjugated dienes to form random or block copolymers. Generally, the presence of a small amount of polar compound, such as the ether solvent in which the initiator is prepared, encourages the formation of random copolymers when both monomers are charged at the same time.

Polar monomers can be employed to form block copolymers with the conjugated dienes named. The polar monomer is charged after the conjugated diene has polymerized. Among the polar monomers applicable are vinylpyridines and vinylquinolines in which the vinyl group is positioned on a ring carbon other than a beta-carbon with respect to the nitrogen. These pyridine, quinoline, and isoquinoline derivatives can carry substituents such as alkyl, cycloalkyl, aryl, alkaryl, aralkyl, alkoxy, aryloxy, and dialkylamino groups. The total number of carbon atoms in the combined substituents is generally not greater than 12. Also, there should be no primary or secondary alkyl groups on ring carbons in the alpha and gamma positions with respect to the nitrogen. Examples of these heterocyclic-nitrogen monomers are 2-vinylpyridine
4-vinylpyridine
3,5-diethyl-4-vinylpyridine
5-methyl-2-vinylpyridine
5-n-octyl-2-vinylpyridine
3-n-dodecyl-2-vinylpyridine
3,5-di-n-hexyl-4-vinylpyridine
5-cyclohexyl-2-vinylpyridine
4-phenyl-2-vinylpyridine
3,5-di-tert-butyl-2-vinylpyridine
3-benzyl-4-vinylpyridine
6-methoxy-2-vinylpyridine
4-phenoxy-2-vinylpyridine
4-dimethylamino-2-vinylpyridine
3,5-dimethyl-4-diamylamino-2-vinylpyridine
2-vinylquinoline
4-vinylquinoline
2-tert-butyl-4-vinylquinoline
3-methyl-4-vinylquinoline
3-cyclohexyl-4-vinylquinoline
3-methyl-4-ethoxy-2-vinylquinoline
1-vinylisoquinoline
3-vinylisoquinoline
4-tert-dodecyl-1-vinylisoquinoline
3-dimethylamino-3-vinylisoquinoline
4-benzyl-3-vinylisoquinoline
4-phenyl-1-vinylisoquinoline, and the like Other polar monomers include acrylic and alkacrylic acid esters, nitriles, and N,N-disubstituted amides, such as methyl acrylate, ethyl acrylate, butyl acrylate, methyl methacrylate, ethyl methacrylate, propyl methacrylate, butyl methacrylate, methyl ethacrylate, ethyl ethacrylate, isopropyl ethacrylate, acrylonitrile, methacrylonitrile, N,N-dimethylacrylamide, and N,N-diethylmethacrylamide. Vinylfuran and N-vinylcarbazole can also be used.

When it is desired that the polymer formed exhibit rubbery characteristics, the conjugated diene should be employed as a major amount of the monomer polymerized. The initiator compositions prepared according to this invention are particularly valuable in forming these conjugated diene polymers. It should be understood, however, that these initiator compositions can also be used when preparing homopolymers or copolymers of the vinyl-substituted aromatic compounds or the polar monomers named. Also, block copolymers can be formed between the vinyl-substituted aromatic compounds and these polar monomers.

The amount of initiator which can be used will vary depending on the polymer prepared, and particularly the molecular weight desired. Usually the terminally reactive polymers are liquids, having molecular weights in the range of 1000 to about 20,000. However, depending on the monomers employed in the preparation of the polymers and the amount of initiator used, semi-solid and solid terminally reactive polymers can be prepared having molecular weights up to 150,000 and higher. Usually the initiator is used in amounts between about 0.25 and about 100 millimoles per 100 grams of monomer.

The polymerization reaction is generally carried out in the range between $-100$ and $+150°$ C. and preferably between $-75$ and $+75°$ C. The particular temperature employed will depend on both the monomers and the initiator used in preparing the polymers. The amount of initiator used is preferably in the range between about 1 and 30 millimoles per 100 grams of monomer. It is preferred that the polymerization be carried out in the presence of a suitable diluent such as benzene, toluene, cyclohexane, methylcyclohexane, xylene, n-butane, n-hexane, n-heptane, isooctane, or the like. Generally, the diluent is selected from hydrocarbons, for example paraffins, cycloparaffins or aromatics containing from 4 to 10 carbon atoms per molecule.

The polymers that are thus prepared using the initiators according to my invention range from liquids to solid rubbery materials. The unquenched polymer solutions can be treated with various reagents to introduce functional groups replacing the terminal lithium atoms on the polymer molecules resulting from the polymerization itself. For example, polymer in solution can be contacted with carbon dioxide and subsequently with an acid to replace the lithium atoms with —COOH groups. Other functional groups which can be introduced as disclosed in the copending application of Uraneck et al., Serial No. 772,167, filed November 6, 1958, include —SH, —OH, halogen and the like. Of particular interest are the carboxy-containing liquid polymers which can be cured to solid compositions alone or in the form of binders for solid materials. For example, the carboxy-telechelic polymers can be coupled and/or cured by reacting the polymer with tri(2-methyl-1-aziridinyl)phosphine oxide.

Other advantages of my invention are illustrated by the following examples. The specific materials and conditions given in the examples are presented as being typical and should not be construed to limit my invention unduly.

Examples of certain of the polymer products produced in the runs described in the examples were examined by infrared analysis. This work was carried out in order to determine the percentage of the polymer formed by cis 1,4-addition, trans 1,4-addition and 1,2-addition of the butadiene. The procedure described hereinafter was employed in making these determinations.

The polymer samples were dissolved in carbon disulfide so as to form a solution having 25 grams polymer per liter of solution. The infrared spectrum of each of the solutions (percent transmission) were then determined in a commercial infrared spectrometer.

The percent of the total unsaturation present as trans 1,4- was calculated according to the following equation and consistent units:

$$\epsilon = \frac{E}{tc}$$

where $\epsilon$=extinction coefficient (liters-moles$^{-1}$-centimeters$^{-1}$); $E$=extinction (log $I_0/I$); $t$=path length (centimeters); and $c$=concentration (moles double bond/liter). The extinction was determined at the 10.35 micron band and the extinction coefficient was 146 (liters-moles$^{-1}$-centimeters$^{-1}$).

The percent of the total unsaturation present as 1,2- (or vinyl) was calculated according to the above equation, using the 11.0 micron band and an extinction coefficient of 209 (liters-moles$^{-1}$-centimeters$^{-1}$).

The percent of the total unsaturation present as cis 1,4- was obtained by subtracting the trans 1,4- and 1,2- (vinyl) determined acording to the above procedures from the theoretical unsaturation, assuming one double bond per each $C_4$ unit in the polymer.

EXAMPLE I

Two series of runs were made for the preparation of lithium adducts of isoprene and butadiene. The lithium contained variable amounts of sodium. Recipes were as follows:

|  | A | B |
|---|---|---|
| Isoprene, mole | 0.10 | |
| 1,3-butadiene, mole | | 0.10 |
| Lithium wire, gram atom | 0.40 | 0.40 |
| Diethyl ether, milliliters | 100 | 100 |
| Temperature, °F | variable | -15 |
| Time, hours | variable | variable |

The reactions were carried out in an atmosphere of nitrogen. The alkalinity, expressed as normality, was determined by withdrawing a sample of the solution and titrating it with 0.1 N HCl. Maximum normality was calculated assuming complete conversion of the diene, two lithium atoms reacting per molecule of diene. From the normality determined by titration and maximum normality previously calculated, the average number of diene units per two lithium atoms is calculated, assuming complete conversion of the diene. This value is represented by $n$ in the table and is an approximate value but is indicative of the nature of the reaction. Results of the runs are shown in the following table:

Table I

| Run No. | Recipe | Temp., °F. | Na in Li Wire, Wt. percent | Alkalinity, N | | | | $n$ |
|---|---|---|---|---|---|---|---|---|
| | | | | Maximum | 24 hrs. | 72 hrs. | 144 hrs. | |
| 1 | A | -15 | <0.005 | 1.8 | | 0 | 0 | |
| 2 | A | -15 | 0.8 | 1.8 | | 0.22 | 0.34 | 5.3 |
| 3 | A | -15 | 2.0 | 1.8 | | 0.43 | 0.44 | 4.1 |
| 4 | A | 41 | <0.005 | 1.8 | 0 | 0 | | |
| 5 | A | 41 | 0.8 | 1.8 | 0.31 | 0.33 | | 5.5 |
| 6 | A | 41 | 2.0 | 1.8 | 0.42 | 0.42 | | 4.3 |
| 7 | B | -15 | <0.005 | 1.8 | | 0 | 0 | |
| 8 | B | -15 | 0.8 | 1.8 | | 0 | 0 | |
| 9 | B | -15 | 2.0 | 1.8 | | 0.10 | 0.10 | 19 |

These runs shows that adducts of isoprene with lithium can be easily prepared at −15° F. as well as at 41° F. if sodium is present in the lithium, as in runs 2, 3, 5 and 6. The isoprene is present as a short chain polymer in each product. Reactions occurred at a more rapid rate at the higher temperature and with the larger amount of sodium. Butadiene does not give the same results as isoprene. In the only run in which reaction occurred, a much longer polymer chain was formed.

The lithium adducts with isoprene prepared in runs 2, 3, 5 and 6 were employed as initiators for the polymerization of butadiene in accordance with the following recipe:

| 1,3-butadiene, parts by weight | 100 |
|---|---|
| Toluene, parts by weight | 1000 |
| Initiator, millimoles | 25 |
| Temperature, °F | 122 |
| Time, hours | 1.5 |

Charge order: toluene-nitrogen purge-butadiene-initiator.

Following polymerization, each of the reaction mixtures was carbonated using a T-tube. Carbon dioxide, under a pressure of 15–18 p.s.i.g., and the polymer solution were fed into separate arms of the tube where they were mixed. Transfer of the polymer solution from the reactor into the T-tube was effected by nitrogen under a pressure of 20 p.s.i.g. An instantaneous reaction occurred upon contact of carbon dioxide with the lithium-containing polymer. The reaction mixture was transferred to an open vessel through the third arm of the tube and treated with an excess of dilute hydrochloric acid. The aqueous and organic phases were separated, the organic phase was washed with water, and the carboxy-containing polymer was recovered by evaporation of the solvent. Results obtained in each of the runs are shown in the following table:

Table II

| Initiator From Run— | Brookfield Visc. at 77° F., Poise | COOH, percent | Microstructure, percent | | |
|---|---|---|---|---|---|
| | | | Vinyl | trans | cis |
| 2 | 700 | 1.10 | 39.2 | 31.5 | 29.3 |
| 3 | 385 | 1.68 | 42.7 | 34.3 | 23.0 |
| 5 | 810 | 1.28 | 41.6 | 33.2 | 25.2 |
| 6 | 550 | 1.42 | 41.1 | 34.3 | 24.6 |

EXAMPLE II

Lithium containing variable amounts of sodium was used for the preparation of adducts with isoprene in a system containing naphthalene. The following recipe was employed:

| Isoprene, moles | 0.10 |
|---|---|
| Lithium wire, gram atoms | 0.40 |
| Naphthalene, moles | 0.02 |
| Diethyl ether, milliliters | 100 |
| Temperature, °F | Variable |
| Time, hours | Variable |

The reactions were carried out and alkalinity determined as described in Example I. The number of diene units was calculated as in the foregoing examples. Results are shown in the following table:

Table III

| Run No. | Temp., °F. | Na in Li Wire, Wt. percent | Alkalinity, N | | | $n$ |
|---|---|---|---|---|---|---|
| | | | Maximum | 24 Hrs. | 48 Hrs. | |
| 10 | -15 | <0.005 | 2.14 | 0.30 | 0.95 | 2.2 |
| 11 | -15 | 0.8 | 2.14 | 0.84 | 1.00 | 2.1 |
| 12 | -15 | 2.0 | 2.14 | 1.17 | 1.18 | 1.8 |
| 13 | 41 | <0.005 | 2.14 | 0.48 | 0.48 | 4.5 |
| 14 | 41 | 0.8 | 2.14 | 0.61 | 0.69 | 3.1 |
| 15 | 41 | 2.0 | 2.14 | 0.77 | 0.80 | 2.7 |
| 16 | 86 | <0.005 | 2.14 | 0.22 | 0.28 | 7.6 |
| 17 | 86 | 0.8 | 2.14 | 0.35 | 0.36 | 5.9 |
| 18 | 86 | 2.0 | 2.14 | 0.42 | 0.58 | 3.7 |

These data show that the adduct formed at a more rapid rate in the runs containing 0.8 and 2.0 percent sodium in the lithium wire. Furthermore, most of these reactions were substantially complete in 24 hours and, for a given temperature, the diene chain length was shorter than when only a trace of sodium (<0.005 percent) was present.

The reaction products from the first six runs were employed as initiators for the polymerization of butadiene using the recipe and charge order described in Example I. The reaction mixtures were carbonated in the manner previously described. Results were as follows:

*Table IV*

| Initiator, From Run— | Brookfield Visc. at 77° F., Poise | COOH, Percent | Microstructure, Percent | | |
|---|---|---|---|---|---|
| | | | Vinyl | trans | cis |
| 10 | 1,370 | 1.32 | 34.7 | 35.1 | 30.2 |
| 11 | 840 | 1.47 | 38.0 | 37.6 | 24.4 |
| 12 | 920 | 1.46 | 36.2 | 38.5 | 25.3 |
| 13 | 635 | 1.70 | 37.1 | 32.8 | 30.1 |
| 14 | 710 | 1.47 | 36.0 | 34.2 | 29.8 |
| 15 | 930 | 1.50 | 36.6 | 36.9 | 26.5 |

EXAMPLE III

Lithium containing variable amounts of sodium was reacted with butadiene in the presence of naphthalene. The recipe was as follows:

| | |
|---|---|
| 1,3-butadiene, moles | 0.10 |
| Lithium wire, gram atoms | 0.40 |
| Naphthalene, moles | 0.02 |
| Diethyl ether, milliliters | 100 |
| Temperature, °F | Variable |
| Time, hours | Variable |

The procedure was the same as in the foregoing examples. Results were as follows:

*Table V*

| Run No. | Temp., °F. | Na in Li Wire, Wt. Percent | Alkalinity | | | | $n$ |
|---|---|---|---|---|---|---|---|
| | | | Maximum | 24 Hrs. | 72 Hrs. | 144 Hrs. | |
| 19 | −15 | <0.005 | 2.14 | | 0.18 | 0.36 | 5.9 |
| 20 | −15 | 0.8 | 2.14 | | 0.50 | 0.64 | 3.3 |
| 21 | −15 | 2.0 | 2.14 | | 0.66 | 0.68 | 3.1 |
| 22 | 41 | <0.005 | 2.14 | 0.17 | 0.17 | | 12.6 |
| 23 | 41 | 0.8 | 2.14 | 0.22 | 0.22 | | 9.7 |
| 24 | 41 | 2.0 | 2.14 | 0.22 | 0.22 | | 9.7 |

These runs show that the runs containing only a trace of sodium were much slower and did not reach as high a molarity at a given temperature as the runs made in accordance with the invention. The higher molarity runs, as can be seen by the data, contain diene units of shorter chain length than those in which only a trace of sodium was present.

The reaction products from runs 20 and 21 were stripped with nitrogen to remove a portion of the ether and the remaining materials were used as initiators for the polymeriaztion of butadiene using the recipe and charge order of Example I. The polymers were carbonated in the manner previously described. Results were as follows:

*Table VI*

| Initiator From Run— | COOH, Percent | Microstructure, Percent | | |
|---|---|---|---|---|
| | | Vinyl | trans | cis |
| 20 | 1.08 | 32.3 | 39.7 | 28.0 |
| 21 | 0.94 | 33.9 | 40.8 | 25.3 |

EXAMPLE IV

Lithium wire containing 2 percent sodium was used in a series of reactions in which the concentrations of isoprene and naphthalene were varied as well as their mole ratios. Alkalinity was determined by titration with 0.1 N HCl and the number of diene units per two lithium atoms calculated as previously described. Results were as follows:

*Table VII*

| Run No. | Isoprene, Mole | Naphthalene, Mole | Isoprene/Naph., Mole Ratio | Diethyl Ether, Ml. | Li Wire, Gm. Atom | Temp., °F. | Alkalinity | | $n$ |
|---|---|---|---|---|---|---|---|---|---|
| | | | | | | | Max. | 48 Hrs. | |
| 25 | 0.10 | 0.02 | 5/1 | 100 | 0.4 | −15 | 2.14 | 1.03 | 2.1 |
| 26 | 0.15 | 0.03 | 5/1 | 100 | 0.6 | −15 | 3.04 | 1.42 | 2.2 |
| 27 | 0.20 | 0.04 | 5/1 | 100 | 0.8 | −15 | 3.86 | 1.70 | 2.3 |
| 28 | 0.40 | 0.08 | 5/1 | 100 | 1.6 | −15 | 6.44 | 2.25 | 2.9 |
| 29 | 0.80 | 0.16 | 5/1 | 100 | 2.4 | −15 | 10.04 | 1.35 | 7.2 |
| 30 | 0.40 | 0.04 | 10/1 | 100 | 1.6 | −15 | 6.16 | 1.84 | 3.3 |
| 31 | 0.40 | 0.02 | 20/1 | 100 | 1.6 | −15 | 5.96 | 1.65 | 3.6 |
| 32 | 0.10 | 0.02 | 5/1 | 100 | 0.4 | 41 | 2.14 | 0.70 | 3.1 |
| 33 | 0.15 | 0.03 | 5/1 | 100 | 0.6 | 41 | 3.06 | 0.90 | 3.4 |
| 34 | 0.20 | 0.04 | 5/1 | 100 | 0.8 | 41 | 3.90 | 1.08 | 3.6 |

These data show that satisfactory reaction products can be obtained even though there is considerable variation in concentrations of isoprene and naphthalene, in mole ratios of these ingredients, and in temperature.

The products prepared in runs 26 and 27 were each treated with butadiene to increase their solubility. Four moles of butadiene was added per mole of reaction product, the addition being made in three increments. Temperature was regulated at 41° F. for this treatment. After addition of the butadiene, ether was partially removed by purging with nitrogen and the remaining material was dissolved in toluene. The two products were employed as initiators for the polymerization of butadiene using the recipe of Example I. The polymers were carbonated in the manner previously described. Results were as follows:

*Table VIII*

| Treated Initiator From Run— | Brookfield Visc. at 77° F., Poise | COOH, Percent | Microstructure, Percent | | |
|---|---|---|---|---|---|
| | | | Vinyl | trans | cis |
| 26 | 350 | 1.95 | 24.6 | 44.3 | 31.1 |
| 27 | 290 | 1.74 | 29.7 | 41.5 | 28.8 |

These initiators gave low viscosity polymers with a high carboxy content. The amount of vinyl polymer was decreased in this type of system by reducing the amount of ether in the initiator.

EXAMPLE V

Lithium wire containing 2 percent sodium was used in a series of reactions with isoprene and methylnaphthalene. Variable amounts of the different materials were used. These quantities together with results obtained are shown in the following table:

Table IX

| Run No. | MBD, Mole | Methyl-naphthalene, Mole | Diethyl Ether, Ml. | Li Wire, Gm. Atom | Temp., °F. | Alkalinity N | | | | n |
|---|---|---|---|---|---|---|---|---|---|---|
| | | | | | | Max. | 48 Hrs. | 72 Hrs. | 144 Hrs. | |
| 35 | 0.10 | 0.02 | 50 | 0.4 | −15 | 3.84 | 2.05 | 2.08 | | 1.8 |
| 36 | 0.20 | 0.04 | 50 | 0.8 | −15 | 6.34 | 2.36 | 2.36 | 2.62 | 2.4 |
| 37 | 0.40 | 0.08 | 50 | 1.2 | −15 | [1] 5.96 | 2.40 | 2.40 | [1] 1.86 | 3.2 |
| 38 | 0.80 | 0.16 | 50 | 2.4 | −15 | 12.60 | | 1.30 | | 9.8 |

[1] Mixture became viscous and 60 milliliters of toluene was added.

It will be evident to those skilled in the art that many variations and modifications can be practiced upon consideration of the foregoing disclosure. Such variations and modifications are believed to be within the spirit and scope of the present invention.

I claim:

1. A process for preparing a polymerization initiator composition which comprises contacting lithium with a monomer selected from the group consisting of conjugated dienes and vinylidene-substituted aromatic compounds in a medium of aliphatic monoether in the presence of sodium in an amount ranging from about 0.25 to about 5 weight percent based on lithium.

2. A process according to claim 1 wherein the amount of sodium present ranges from about 0.5 to about 3 weight percent based on lithium.

3. A process according to claim 1 wherein said contacting is further carried out in the presence of a promoter selected from the group consisting of polycyclic aromatic compounds and polyaryl-substituted ethylenes containing from 2 to 4 aryl groups selected from the group consisting of phenyl and naphthyl.

4. A process for preparing a polymerization initiator composition which comprises contacting lithium with a monomer selected from the group consisting of conjugated dienes and vinylidene-substituted aromatic compounds in a solvent ether having the formula ROR wherein each R is an alkyl group containing from 2 to 12 carbon atoms in the presence of sodium in an amount ranging from about 0.25 to about 5 weight percent based on lithium.

5. A process according to claim 4 wherein said monomer is 1,3-butadiene and said solvent is diethyl ether.

6. A process according to claim 4 wherein said monomer is isoprene and said solvent is diethyl ether.

7. A process according to claim 5 wherein said contacting is further carried out in the presence of a promoter selected from the group consisting of polycyclic aromatic compounds and polyaryl-substituted ethylenes containing from 2 to 4 aryl groups selected from the group consisting of phenyl and naphthyl.

8. A process according to claim 7 wherein said promoter is a naphthalene.

9. A process for preparing a polymerization initiator composition which comprises contacting lithium with a monomer selected from a group consisting of conjugated dienes and vinylidene-substituted aromatic compounds in a medium of ether having the formula ROR wherein each R is an alkyl group containing from 2 to 12 carbon atoms and up to about 2 moles of a promoter per mole of said monomer, said promoter being selected from the group consisting of polycyclic aromatic compounds and polyaryl-substituted ethylenes containing from 2 to 4 aryl groups selected from the group consisting of phenyl and naphthyl, at about −40 to 170° F. for at least about 10 minutes in the presence of sodium in an amount ranging from about 0.25 to about 5 percent based on lithium, the amount of said ether being about 1 to 20 moles per mole of said monomer, and the ratio of lithium to monomer being at least about 1 gram atom of lithium per mole of monomer.

10. A process according to claim 9 wherein said monomer is isoprene, said ether is diethyl ether, and said promoter is naphthalene.

11. A process according to claim 9 wherein said monomer is isoprene, said ether is diethyl ether, and said promoter is methylnaphthalene.

12. A process according to claim 9 wherein said monomer is 1,3-butadiene, said ether is diethyl ether, and said promoter is naphthalene.

13. An initiator composition prepared according to the process of claim 1.

14. An initiator composition prepared according to the process of claim 9.

15. A process for preparing a polymer of a conjugated diene which comprises contacting a conjugated diene having 4 to 12 carbon atoms per molecule in a predominantly hydrocarbon medium with an initiator composition prepared according to process of claim 1, and recovering the resulting conjugated diene polymer.

16. A process for preparing a polymer of 1,3-butadiene which comprises contacting 1,3-butadiene under polymerization conditions in a predominantly hydrocarbon medium with an initiator composition prepared by contacting lithium, isoprene, a naphthalene and sodium in a medium of ethyl ether, and recovering the resulting polymer, the amount of sodium present ranging from about 0.5 to about 3 weight percent based on lithium.

17. A process for preparing a polymer of 1,3-butadiene which comprises contacting 1,3-butadiene under polymerization conditions in a predominantly hydrocarbon medium with an initiator composition prepared by contacting lithium, 1,3-butadiene, a naphthalene and sodium in a medium of ethyl ether, and recovering the resulting polymer, the amount of sodium present ranging from about 0.5 to about 3 weight percent based on lithium.

References Cited in the file of this patent

UNITED STATES PATENTS

| 1,073,116 | Harries | Sept. 16, 1913 |
| 2,048,169 | Scott | July 21, 1936 |

FOREIGN PATENTS

| 223,817 | Australia | Sept. 11, 1959 |

OTHER REFERENCES

Ziegler, "Rubber Chem. and Tech.," vol. 11, pages 501–7 (1938).